(12) United States Patent
Hudman et al.

(10) Patent No.: US 8,107,147 B2
(45) Date of Patent: Jan. 31, 2012

(54) TWO-MIRROR SCANNING SYSTEM

(75) Inventors: Joshua M. Hudman, Sammamish, WA (US); Wyatt O. Davis, Bothell, WA (US); Dean R. Brown, Lynnwood, WA (US)

(73) Assignee: Microvision, Inc., Redmond, WA (US)

( * ) Notice: Subject to any disclaimer, the term of this patent is extended or adjusted under 35 U.S.C. 154(b) by 519 days.

(21) Appl. No.: 12/413,201

(22) Filed: Mar. 27, 2009

(65) Prior Publication Data

US 2010/0245957 A1 Sep. 30, 2010

(51) Int. Cl.
*G02B 26/08* (2006.01)
(52) U.S. Cl. .................. 359/202.1; 359/224.2; 359/730; 359/861
(58) Field of Classification Search ............... 359/201.1, 359/201.2, 202.1, 223.1–224.2, 730, 857, 359/861, 862
See application file for complete search history.

(56) References Cited

U.S. PATENT DOCUMENTS

| | | | |
|---|---|---|---|
| 4,761,056 A * | 8/1988 | Evans et al. | 359/631 |
| 5,365,307 A | 11/1994 | Sugiyama | |
| 6,947,189 B2 * | 9/2005 | Hagelin et al. | 359/201.1 |
| 7,130,095 B1 | 10/2006 | Wood | |
| 7,307,650 B2 | 12/2007 | Wittenberg et al. | |
| 2004/0136204 A1 | 7/2004 | Asao | |
| 2005/0167507 A1 | 8/2005 | Swartz et al. | |
| 2006/0082852 A1* | 4/2006 | Wine et al. | 359/199 |
| 2006/0232845 A1* | 10/2006 | Harned et al. | 359/212 |
| 2006/0289653 A1* | 12/2006 | Wittenberg et al. | 235/462.37 |
| 2007/0030550 A1 | 2/2007 | Shiraishi | |
| 2007/0081220 A1 | 4/2007 | Yokoyama | |
| 2007/0229668 A1 | 10/2007 | He et al. | |

* cited by examiner

*Primary Examiner* — Frank Font
(74) *Attorney, Agent, or Firm* — Kevin D. Wills (57) ABSTRACT

A scanning beam projection system includes a two-mirror scanning system. One mirror scans in one direction, and a second mirror scans in a second direction. A fast scan mirror receives a modulated light beam from a fold mirror and directs the modulated light beam to a slow can mirror. The fold mirror may be formed on an output optic or may be formed on a common substrate with the slow scan mirror.

23 Claims, 6 Drawing Sheets

TWO-MIRROR SCANNING SYSTEM

FIELD

The present invention relates generally to scanning beam display systems, and more specifically to scanning beam display systems that utilize two scanning mirrors.

BACKGROUND

Scanned light beams are used to produce display images for a wide variety of applications, including such applications as mobile microprojectors, automotive head-up displays, and head-worn displays. The displays are created by using the angular motion of one or more mirrors to deflect a modulated light beam to cover the desired field of view. Single mirror systems provide for very compact optical systems, but controlling movement of a single mirror in multiple dimensions provides engineering challenges. Two-mirror systems allow simpler mirror controls, but are inherently larger than single mirror systems.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
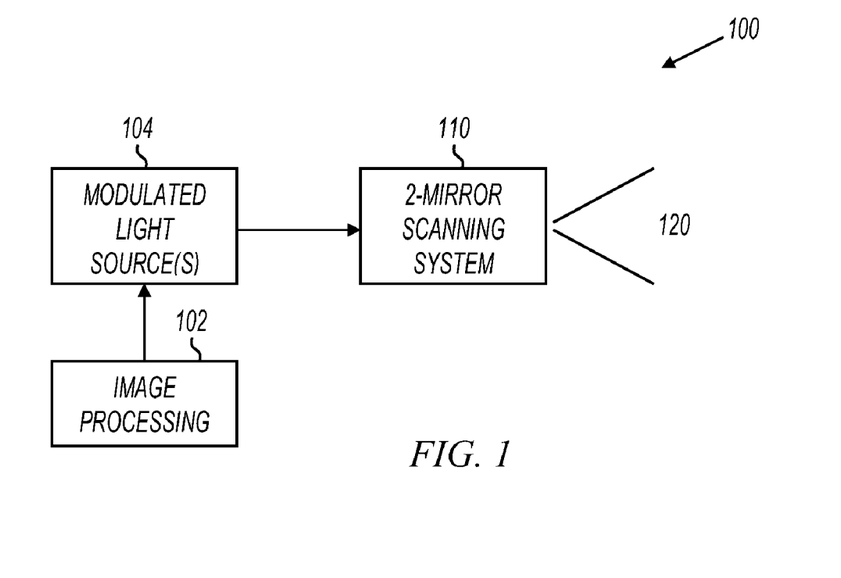
FIG. 1 shows a block diagram of a scanned beam projection system in accordance with various embodiments of the present invention.

FIG. 1 shows a scanned beam projection system in accordance with various embodiments of the present invention. As shown in FIG. 1, scanned beam projection system 100 includes image processing 102, modulated light sources 104, and two-mirror scanning system 110. Image processing 102 may be any image source. For example, in some embodiments, image processing 102 includes memory that holds still images. In other embodiments, image processing 102 includes memory that includes video images. In still further embodiments, image processing 102 includes images or video from external sources using connectors, radio links, or the like. Image processing 102 may also include processing circuitry and software to determine when to modulate light sources 104.

Modulated light sources 104 may be a laser light source such as a laser diode or the like, capable of emitting a beam 112 which may be a laser beam. The beam 112 may be monochromatic or may include light of different wavelengths. For example, in some embodiments, modulated light sources 104 includes red, green, and blue laser light sources, and beam 112 includes red, green, and blue light at varying intensities.

Two-mirror scanning system 110 receives the beam 112 and performs a scanning function. One mirror scans the beam in a first dimension, and the second mirror scans the beam in a second dimension. For example, the first mirror may scan the beam horizontally to form a scan line, and the second mirror may reflect the entire scan line vertically. When the two mirrors are timed correctly, a raster image is painted at 120.

In some embodiments, two-mirror scanning system 110 includes a fold mirror integrated with an output optic. Integrating the fold mirror with the output optic allows the two-mirror scanning system to be smaller. Also in some embodiments, a fold mirror is integrated on a scanning mirror substrate. For example, a micro-electromechanical systems (MEMS) scanning mirror may be supported by a substrate, and a fold mirror may be formed on, or integrated with, the substrate. This allows the fold mirror to be positioned very close to the scanning mirror, which also allows the two-mirror scanning system to be smaller. Various embodiments of two-mirror scanning systems, output optics with integrated fold mirrors, and scanning mirror substrates with integrated fold mirrors are described in more detail below.

Figure 2:
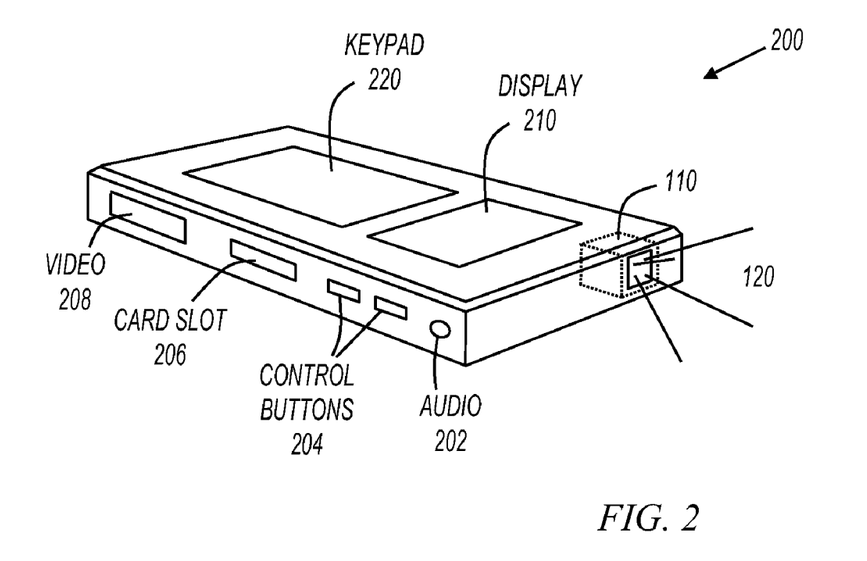
FIG. 2 shows a mobile device in accordance with various embodiments of the present invention.

FIG. 2 shows a mobile device in accordance with various embodiments of the present invention. Mobile device 200 may be a hand held projection device with or without communications ability. For example, in some embodiments, mobile device 200 may be a handheld projector with little or no other capabilities. Also for example, in some embodiments, mobile device 200 may be a device usable for communications, including for example, a cellular phone, a smart phone, a personal digital assistant (PDA), a global positioning system (GPS) receiver, or the like. Further, mobile device 200 may be connected to a larger network via a wireless (e.g., WiMax) or cellular connection, or this device can accept data messages or video content via an unregulated spectrum (e.g., WiFi) connection.

Mobile device 200 includes two-mirror scanning system 110 to create an image with light at 120. Mobile device 200 also includes image processing and modulated light sources (FIG. 1); however, they are intentionally omitted from FIG. 2 for clarity.

Mobile device 200 includes display 210, keypad 220, audio port 202, control buttons 204, card slot 206, and audio/video (A/V) port 208. None of these elements are essential. For example, mobile device 200 may only include two-mirror scanning system 110 without any of display 210, keypad 220, audio port 202, control buttons 204, card slot 206, or A/V port 208. Some embodiments include a subset of these elements. For example, an accessory projector product may include two-mirror scanning system 110, control buttons 204 and A/V port 208.

Display 210 may be any type of display. For example, in some embodiments, display 210 includes a liquid crystal display (LCD) screen. Display 210 may always display the same content projected at 120 or different content. For example, an accessory projector product may always display the same content, whereas a mobile phone embodiment may project one type of content at 120 while display different content on display 210. Keypad 220 may be a phone keypad or any other type of keypad.

A/V port 208 accepts and/or transmits video and/or audio signals. For example, A/V port 208 may be a digital port that accepts a cable suitable to carry digital audio and video data. Further, A/V port 208 may include RCA jacks to accept composite inputs. Still further, A/V port 208 may include a VGA connector to accept analog video signals. In some embodiments, mobile device 200 may be tethered to an external signal source through A/V port 208, and mobile device 200 may project content accepted through A/V port 208. In other embodiments, mobile device 208 may be an originator of content, and A/V port 208 is used to transmit content to a different device.

Audio port 202 provides audio signals. For example, in some embodiments, mobile device 200 is a media player that can store and play audio and video. In these embodiments, the video may be projected at 120 and the audio may be output at audio port 202. In other embodiments, mobile device 200 may be an accessory projector that receives audio and video at A/V port 208. In these embodiments, mobile device 200 may project the video content at 120, and output the audio content at audio port 202.

Mobile device 200 also includes card slot 206. In some embodiments, a memory card inserted in card slot 206 may provide a source for audio to be output at audio port 202 and/or video data to be projected at 120. Card slot 206 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

In some embodiments, two-mirror scanning system 110 displays a high definition (HD) image, such as a 720p or 1080p image. In these embodiments, the two separate scanning mirrors are controlled relative to the modulated light sources to create an HD raster image. As described in more detail below, the two-mirror embodiments are kept small so that the form factor of mobile device 200 may also be kept small.

Figure 3:
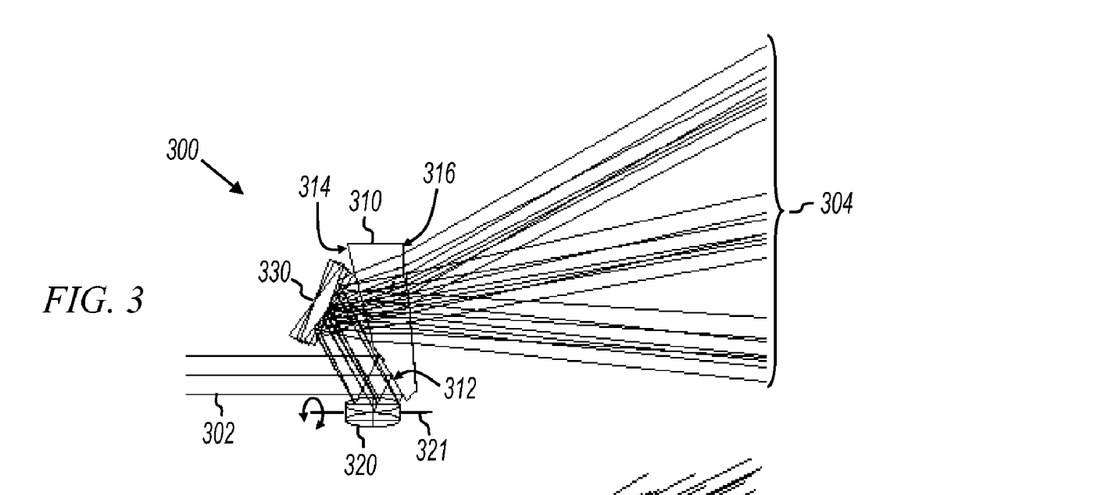
FIGS. 3-5 show side, top, and perspective views of a scanning system with two scanning mirrors and a single fold mirror.
Figure 4:
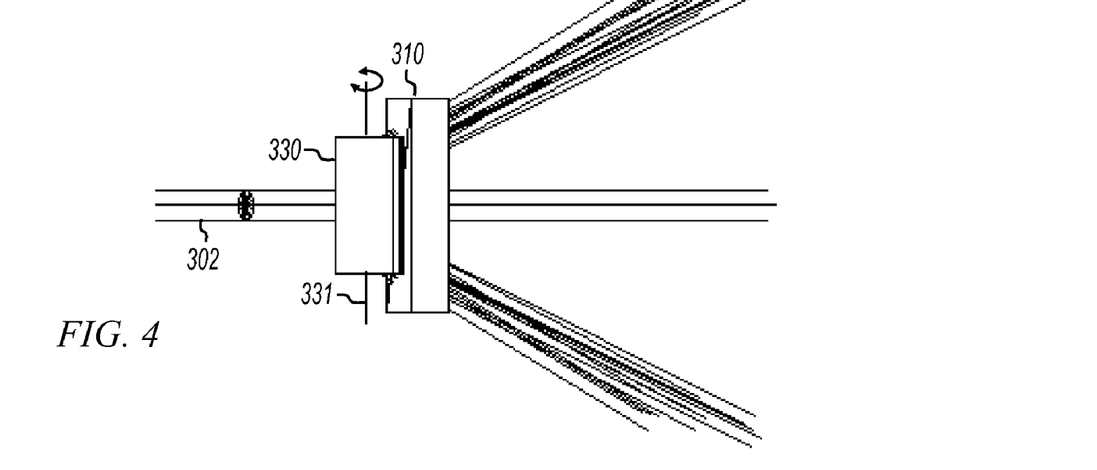
Figure 5:
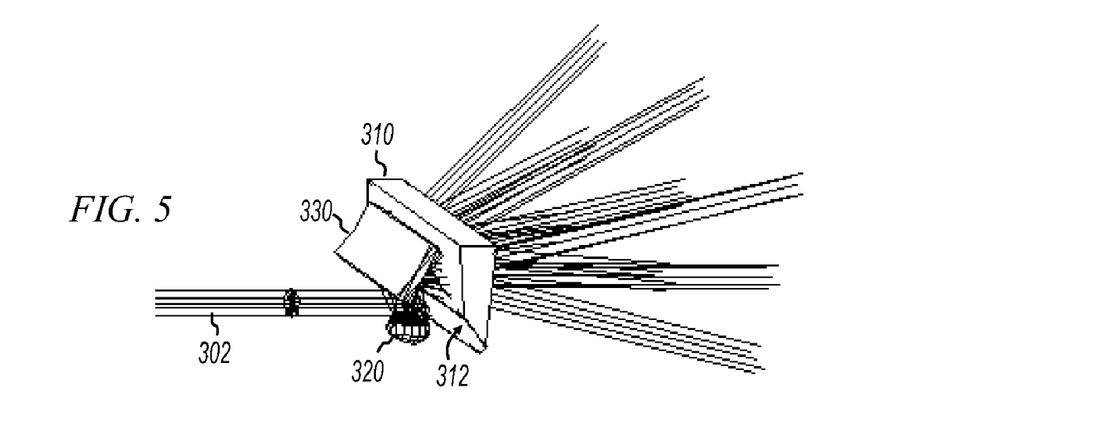

FIGS. 3-5 show side, top, and perspective views of a scanning system with two scanning mirrors and a single fold mirror. Referring now to FIG. 3, two-mirror scanning system 300 includes scanning mirrors 320 and 330, and output optic 310. A surface 312 of output optic 310 forms a fold mirror. In operation, light beam 302 enters system 300 and reflects off fold mirror 312. Scanning mirror 320 is positioned to receive the light reflected from the fold mirror and scans the light beam in a first dimension. Scanning mirror 330 is positioned to receive the light beam from scanning mirror 320 and scans it in a second dimension. Output optic 310 is positioned to intersect the light beam from scanning mirror 330, where fold mirror 312 is positioned on output optic 310. Light from scanning mirror 330 leaves scanning system 300 after passing through output optic 310. The light leaving two-mirror scanning system 300 is scanned in two dimensions by operation of the two scanning mirrors, and paints a raster image at 304.

Scanning mirror 320 scans back and forth with an angular displacement about axis 321. In FIG. 3, axis 321 is shown in the plane of the page. As shown in FIG. 4, scanning mirror 330 scans back and forth with an angular displacement about axis 331. In FIG. 4, axis 331 is shown in the plane of the page. The two axes 321 and 331 are oriented substantially 90 degrees from one another so as to provide scanning in separate dimensions by scanning mirrors 320 and 330.

In some embodiments, scanning mirror 320 is a "fast scan" mirror, and scanning mirror 330 is a "slow scan" mirror, although this is not a limitation of the present invention. For example, scanning mirror 320 may scan faster or slower than scanning mirror 330. In some embodiments, scanning mirror 320 may sweep once for each horizontal line in an image, and scanning mirror 330 may sweep once for each vertical retrace in an image. One skilled in the art will appreciate that varying the sweep rates of the two scanning mirrors and the modulation rates of the light sources accommodates various image resolutions. For example, increasing the horizontal sweep rate relative to the vertical sweep rate provides an image with more horizontal lines, and increasing the modulation rate of the light sources provides an image with more pixels per horizontal line.

Scanning mirrors 320 and 330 may be any device suitable to scan a light beam as described. For example in some embodiments, scanning mirrors 320 and 330 are MEMS scanning mirrors. Movement of MEMS scanning mirrors may be controlled by one or more actuation mechanisms responsive to one or more control signals. For example, in some embodiments, a magnetic actuation mechanism including one or more conductive coils and/or one or more fixed magnets may be employed. In other embodiments, an electrostatic actuation mechanism may be employed. The various embodiments of the present invention are not limited by the type of actuation mechanism used for either of scanning mirrors 320 and 330.

Fold mirror 312 is part of output optic 310. In some embodiments, fold mirror 312 includes a reflective coating applied to output optic 310. In other embodiments, fold mirror 312 is formed by ensuring the input light beam 302 has an incident angle on fold mirror 312 below the critical angle, such that all light is reflected. In still further embodiments, a separate mirror is affixed or bonded to output optic 310 to form fold mirror 312.

In some embodiments, output optic 310 is a wedge optic that alters the output image. In one or more embodiments, output optic 310 may be utilized to reduce or eliminate distortion in an image generated by a two-mirror scanning system 300 that may result inherently in scanned beam display or imaging systems, the distortion being a result of a trajectory of the scanned beam caused by the off axis input beam and a transform from a scanning mirror to an image plane. Alternatively, output optic 310 may be utilized to impart or increase an amount of distortion in an image generated by two-mirror scanning system 300, for example where such increased or otherwise imparted distortion is desirable according to the application. In general, output optic 310 may be utilized to provide some alteration of distortion of the image generated or obtained by two-mirror scanning system 300. In one or more embodiments, output optic 310 generally may comprise an optical element, or a combination of optical elements, having a first surface or plane 314 disposed at a non-parallel angle with respect to a second surface or plane 316. In one or more embodiments, such an arrangement of output optic 310 may comprise a prism or similarly shaped optic such as a frustum, pyramid, cone or the like, and/or alternatively output optic 310 may comprise a first pane of glass or other optical material to embody first surface 314 and a second pane of glass or other optical material to embody second surface 316, and a third pane of glass or other optical material to embody fold mirror 312.

Combining the output optic 310 with fold mirror 312 allows the remaining optical components to be positioned closer together, thereby reducing the overall volume occupied by two-mirror scanning system 300. For example, scanning mirrors 320 and 330 are positioned closer to output optic 310 and also closer to each other. This results in a size reduction of scanning mirror 330 as well as a size reduction of output optic 310.

In some embodiments, scanning mirror 320 is positioned so that when at rest, a reflective surface of scanning mirror 320 is parallel to input light beam 302, although this is not a limitation of the present invention. The input light beam 302 is represented by multiple lines to indicate that the actual light beam may be present anywhere within the indicated cross-section. The output light is shown with multiple lines for the same reason. FIGS. 3-5 show output light trajectories when the mirrors are centered and when the mirrors are at the apex of their angular displacements. In actual operation, the light beams are continuously swept.

In some embodiments, output optic 310 includes mounting features for holding one or both of the scanning mirrors. For example, output optic 310 may include specific features for holding the placement of both scanning mirrors so as to ensure the proper placement of the scanning mirrors with respect to the fold mirror and the output optic. In some embodiments, output optic 310 is a plastic component that works as a mount and an optic at the same time.

Figure 6:
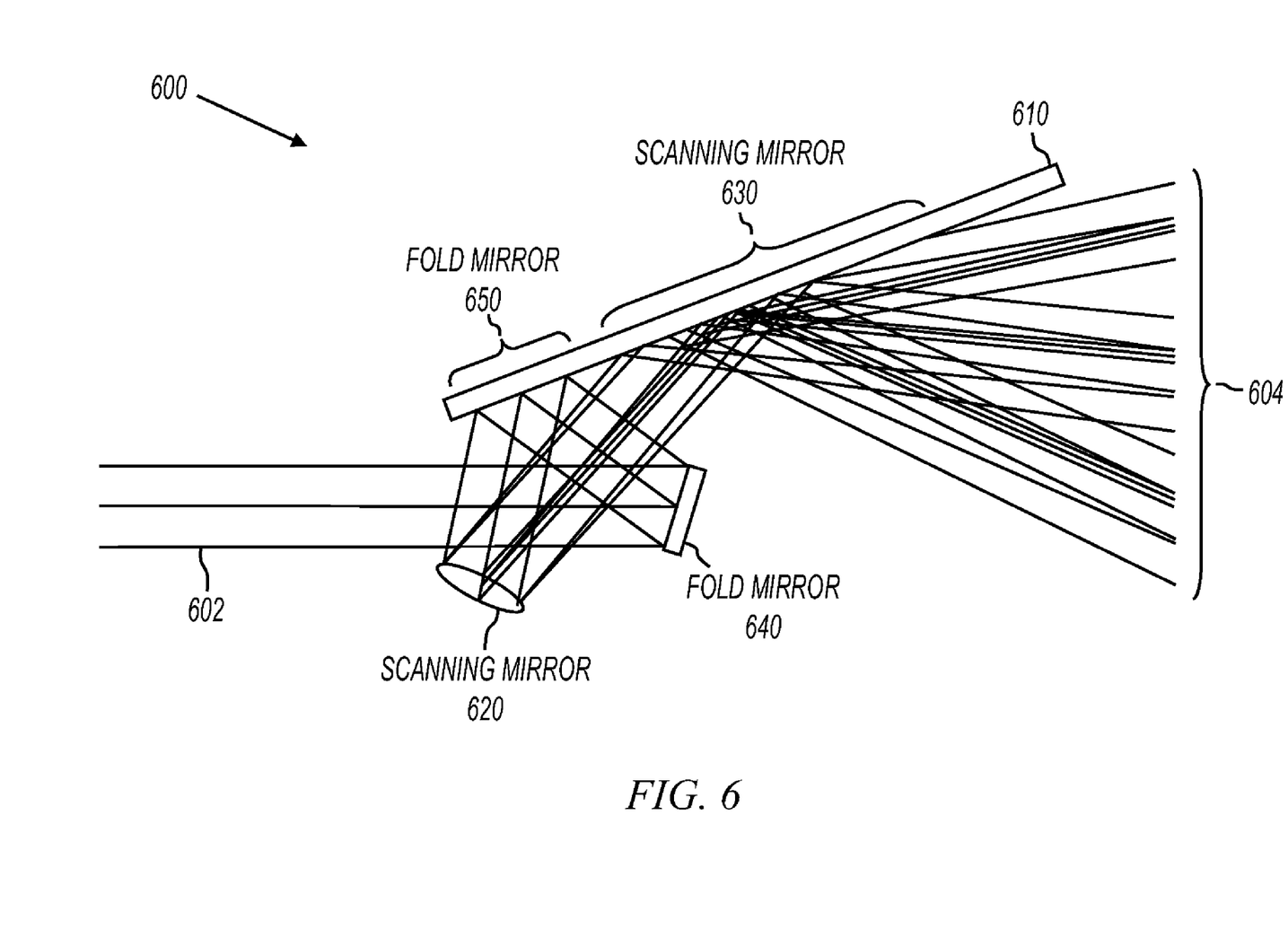
FIG. 6 shows a side view of a scanning system with two scanning mirrors and two fold mirrors.

FIG. 6 shows a side view of a scanning system with two scanning mirrors and two fold mirrors. Scanning system 600 includes two fold mirrors 640 and 650, and two scanning mirrors 620 and 630. In operation, first fold mirror 640 is positioned to reflect input light beam 602, second fold mirror 650 is positioned to reflect light received from first fold mirror 640, first scanning mirror 620 is positioned to receive light from second fold mirror 650 and provide a light beam scanned in a first dimension, and second scanning mirror 630 is positioned to receive the light beam from first scanning mirror 620 and to provide a light beam scanned in a second dimension, where the second scanning mirror 630 and the second fold mirror 650 are coupled to a common substrate 610.

Scanning mirror 630 is shown at rest in the same plane as substrate 610; however, the output light 604 is shown reflected from scanning mirror 630 when at rest as well as when at the apex of its angular displacement. In some embodiments, scanning mirror 630 includes one more components that are out-of-plane with substrate 610. Various embodiments of suitable substrates, scanning mirrors, and fold mirrors are described further below with reference to later figures.

In some embodiments, fold mirror 640 is omitted. In these embodiments, an input light beam is first incident on fold mirror 650. Scanning mirror 620 receives light from fold mirror 650 and scans it in a first dimension, and then scanning mirror 630 scans it in a second dimension.

In some embodiments, scanning mirror 620 is a "fast scan" mirror, and scanning mirror 630 is a "slow scan" mirror, although this is not a limitation of the present invention. For example, scanning mirror 620 may scan faster or slower than scanning mirror 630. In some embodiments, scanning mirror 620 may sweep once for each horizontal line in an image, and scanning mirror 630 may sweep once for each vertical retrace in an image. One skilled in the art will appreciate that varying the sweep rates of the two scanning mirrors and the modulation rates of the light sources accommodates various image resolutions. For example, increasing the horizontal sweep rate relative to the vertical sweep rate provides an image with more horizontal lines, and increasing the modulation rate of the light sources provides an image with more pixels per horizontal line.

Scanning mirrors 620 and 630 may be any device suitable to scan a light beam as described. For example in some embodiments, scanning mirrors 620 and 630 are MEMS scanning mirrors. Angular movement of scanning mirrors 620 and 630 may be controlled by one or more actuation mechanisms responsive to one or more control signals. For example, in some embodiments, a magnetic actuation mechanism including one or more conductive coils and/or one or more fixed magnets may be employed. In other embodiments, an electrostatic actuation mechanism may be employed. The various embodiments of the present invention are not limited by the type of actuation mechanism used for either of scanning mirrors 620 and 630.

Fold mirror 650 is formed on substrate 610. In some embodiments, fold mirror 650 includes a reflective coating applied to substrate 610. In other embodiments, a separate mirror is affixed or bonded to substrate 610 to form fold mirror 650.

Combining fold mirror 650 and scanning mirror 630 on a common substrate 610 allows the remaining optical components to be positioned closer together, thereby reducing the overall volume occupied by two-mirror scanning system 600. For example, scanning mirrors 620 can be positioned closer to scanning mirror 630, resulting in a reduction in the size requirement for scanning mirror 630.

In some embodiments, scanning mirror 620 is positioned so that when at rest, a reflective surface of scanning mirror 620 is parallel to input light beam 602, although this is not a limitation of the present invention. The input light beam 602 is represented by multiple lines to indicate that the actual light beam may be present anywhere within the indicated cross-section. The output light is shown with multiple lines for the same reason. FIG. 6 shows output light trajectories when the mirrors are centered and when the mirrors are at the apex of their angular displacements. In actual operation, the light beams are continuously swept.

Figure 7:
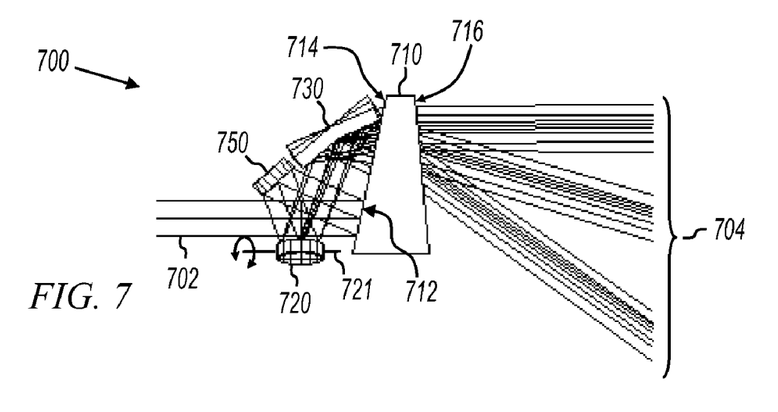
FIGS. 7-9 show side, top, and perspective views of a scanning system with two scanning mirrors, two fold mirrors, and an output optic.
Figure 8:
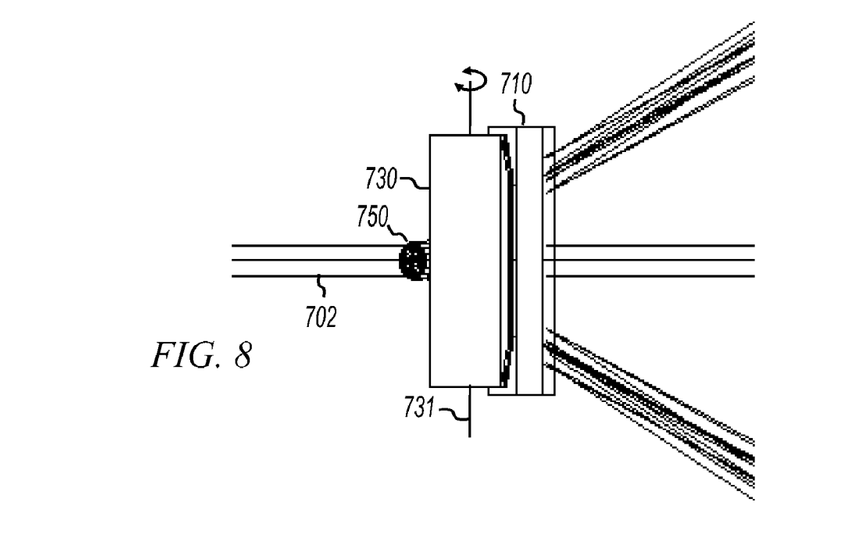
Figure 9:
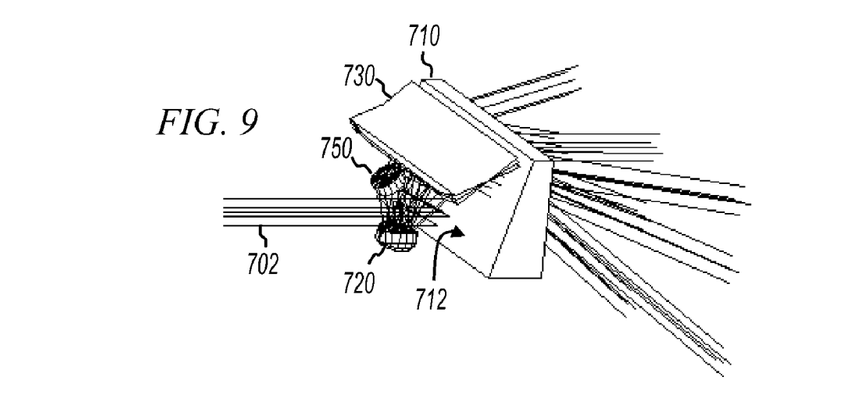

FIGS. 7-9 show side, top, and perspective views of a scanning system with two scanning mirrors, two fold mirrors, and an output optic. Referring now to FIG. 7, two-mirror scanning system 700 includes scanning mirrors 720 and 730, fold mirrors 712 and 750, and output optic 710. Fold mirror 712 is formed on a surface of output optic 710. In operation, light beam 702 enters system 700 and reflects off fold mirror 712. Fold mirror 750 is positioned to receive light reflected from fold mirror 712. Scanning mirror 720 is positioned to receive the light reflected from fold mirror 750 and scans the light beam in a first dimension. Scanning mirror 730 is positioned to receive the light beam from scanning mirror 720 and scans it in a second dimension. Output optic 710 is positioned to intersect the light beam from scanning mirror 730, where fold mirror 712 is positioned on output optic 710. Light from scanning mirror 730 leaves scanning system 700 after passing through output optic 710. The light leaving two-mirror scanning system 700 is scanned in two dimensions by operation of the two scanning mirrors, and paints a raster image at 704.

Scanning mirror 720 scans back and forth with an angular displacement about axis 721. In FIG. 7, axis 721 is shown in the plane of the page. As shown in FIG. 8, scanning mirror 730 scans back and forth with an angular displacement about axis 731. In FIG. 8, axis 731 is shown in the plane of the page. The two axes 721 and 731 are oriented substantially 90 degrees from one another so as to provide scanning in separate dimensions by scanning mirrors 720 and 730.

In some embodiments, scanning mirror 720 is a "fast scan" mirror, and scanning mirror 730 is a "slow scan" mirror, although this is not a limitation of the present invention. For example, scanning mirror 720 may scan faster or slower than scanning mirror 730. In some embodiments, scanning mirror 720 may sweep once for each horizontal line in an image, and scanning mirror 730 may sweep once for each vertical retrace in an image. One skilled in the art will appreciate that varying the sweep rates of the two scanning mirrors and the modulation rates of the light sources accommodates various image resolutions. For example, increasing the horizontal sweep rate relative to the vertical sweep rate provides an image with more horizontal lines, and increasing the modulation rate of the light sources provides an image with more pixels per horizontal line.

Scanning mirrors 720 and 730 may be any device suitable to scan a light beam as described. For example in some embodiments, scanning mirrors 720 and 730 are MEMS scanning mirrors. Movement of MEMS scanning mirrors may be controlled by one or more actuation mechanisms responsive to one or more control signals. For example, in some embodiments, a magnetic actuation mechanism including one or more conductive coils and/or one or more fixed magnets may be employed. In other embodiments, an electrostatic actuation mechanism may be employed. The various embodiments of the present invention are not limited by the type of actuation mechanism used for either of scanning mirrors 720 and 730.

Fold mirror 712 is part of output optic 710. In some embodiments, fold mirror 712 includes a reflective coating applied to output optic 710. In other embodiments, fold mirror 712 is formed by ensuring the input light beam 702 has an incident angle on fold mirror 712 below the critical angle, such that all light is reflected. In still further embodiments, a separate mirror is affixed or bonded to output optic 710 to form fold mirror 712.

In some embodiments, output optic 710 is a wedge optic that alters the output image. In one or more embodiments, output optic 710 may be utilized to reduce or eliminate distortion in an image generated by two-mirror scanning system 700 that may result inherently in scanned beam display or imaging systems, the distortion being a result of a trajectory of the scanned beam caused by the off axis input beam and a transform from a scanning mirror to an image plane. Alternatively, output optic 710 may be utilized to impart or increase an amount of distortion in an image generated by two-mirror scanning system 700, for example where such increased or otherwise imparted distortion is desirable according to the application. In general, output optic 710 may be utilized to provide some alteration of distortion of the image generated or obtained by two-mirror scanning system 700. In one or more embodiments, output optic 710 generally may comprise an optical element, or a combination of optical elements, having a first surface or plane 714 disposed at a non-parallel angle with respect to a second surface or plane 716. In one or more embodiments, such an arrangement of output optic 710 may comprise a prism or similarly shaped optic such as a frustum, pyramid, cone or the like, and/or alternatively output optic 710 may comprise a first pane of glass or other optical material to embody first surface 714 and a second pane of glass or other optical material to embody second surface 716, and a third pane of glass or other optical material to embody fold mirror 712.

Combining the output optic 710 with fold mirror 712 allows the remaining optical components to be positioned closer together, thereby reducing the overall volume occupied by two-mirror scanning system 700. For example, scanning mirrors 720 and 730 are positioned closer to output optic 710 and also closer to each other. This results in a size reduction of scanning mirror 730 as well as a size reduction of output optic 710.

In some embodiments, fold mirror 750 and scanning mirror 730 are formed on a common substrate as shown in FIG. 6. In some embodiments, fold mirror 750 includes a reflective coating applied to the substrate. In other embodiments, a separate mirror is affixed or bonded to a substrate to form fold mirror 750.

Combining fold mirror 750 and scanning mirror 730 on a common substrate allows the remaining optical components to be positioned closer together, thereby reducing the overall volume occupied by two-mirror scanning system 700. For example, scanning mirror 720 can be positioned closer to scanning mirror 730, resulting in a reduction in the size requirement for scanning mirror 730. This also allows for a lower incident angle onto scanning mirror 720, resulting in a smaller package and reduced distortion.

In some embodiments, scanning mirror 720 is positioned so that when at rest, a reflective surface of scanning mirror 720 is parallel to input light beam 702, although this is not a limitation of the present invention. The input light beam 702 is represented by multiple lines to indicate that the actual light beam may be present anywhere within the indicated cross-section. The output light is shown with multiple lines for the same reason. FIGS. 7-9 show output light trajectories when the mirrors are centered and when the mirrors are at the apex of their angular displacements. In actual operation, the light beams are continuously swept.

In some embodiments, output optic 710 includes mounting features for holding other components within two-mirror scanning system 700. For example, output optic 710 may include a feature to hold a substrate upon which fold mirror 750 and scanning mirror 730 are mounted. Also for example, output optic 710 may include a feature to hold the placement scanning mirror 720. Providing these mounting features as part of output optic 710 allows the proper placement of the scanning mirrors with respect to the fold mirrors and the output optic. In some embodiments, output optic 710 is a plastic component that works as a mount and an optic at the same time.

Figure 10:
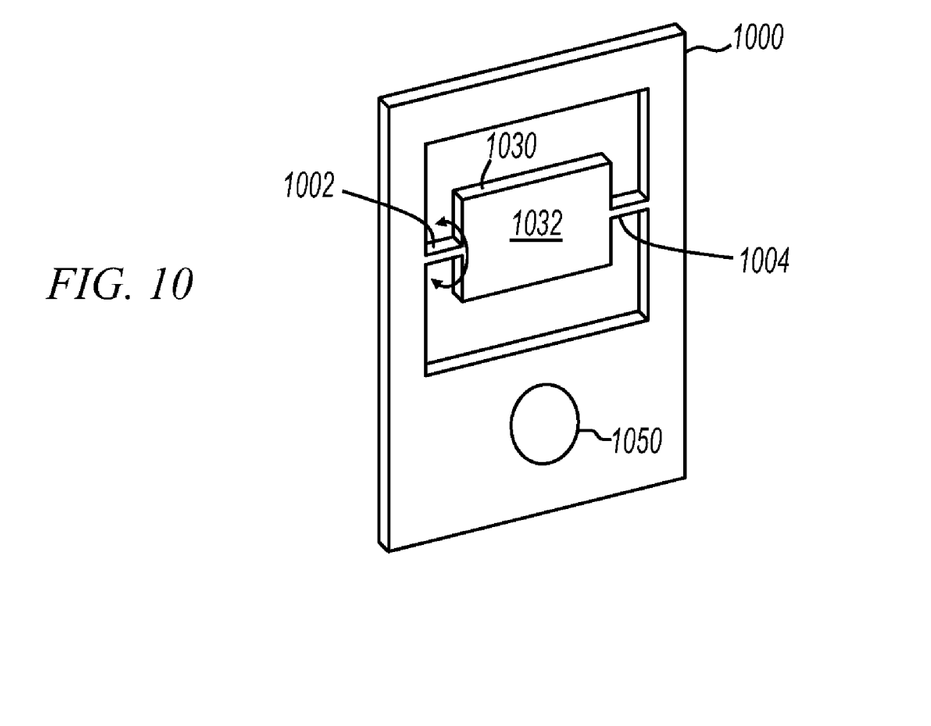
FIG. 10 shows a substrate with a scanning platform and an integrated fold mirror.

FIG. 10 shows a substrate with a scanning platform and an integrated fold mirror. Substrate 1000 is shown having scanning platform 1030 and integrated fold mirror 1050. Substrate 1000 may be formed from a material suitable for MEMS devices, such as silicon; however, the invention is not so limited.

Scanning platform 1030 includes face 1032. In some embodiments, face 1032 is reflective and serves as a mirror. In these embodiments, scanning platform 1030 is a scanning mirror. In these embodiments, a side view of substrate 1000 when the scanning mirror is at rest will appear similar to substrate 610 (FIG. 6).

Scanning platform 1030 is coupled to platform 1000 by flexures 1002 and 1004. A drive mechanism (not shown)

causes scanning platform 1030 to undergo a variable angular displacement relative to substrate 1000 about an axis created by flexures 1002 and 1004. Any type of drive mechanism may be used without departing from the scope of the present invention. For example, a magnetic actuation mechanism or electrostatic mechanism may be utilized.

Fold mirror 1050 is a fixed mirror integrated with substrate 1000. In some embodiments, fold mirror 1050 includes a reflective coating on substrate 1000, and in other embodiments, fold mirror 1050 includes a reflective device affixed or bonded to substrate 1000. A reflective surface of fold mirror 1050 may be parallel to substrate 100 or may not be parallel substrate 1000. For example, in some embodiments, a reflective coating is applied to substrate 1000 to form fold mirror 1050 parallel to substrate 1000. In other embodiments, a mirror having non-parallel surfaces may be bonded to substrate 1000 to form fold mirror 1050 non-parallel to substrate 1000.

Substrate 1000 may be utilized in any of the aforementioned embodiments. For example, substrate 1000 may be used as substrate 610 in embodiments described with reference to FIG. 6. Also for example, substrate 1000 may be used in embodiments described with reference to FIGS. 7-9, in which scanning mirror 730 corresponds to scanning platform 1030, and fold mirror 750 corresponds to fold mirror 1050.

Figure 11:
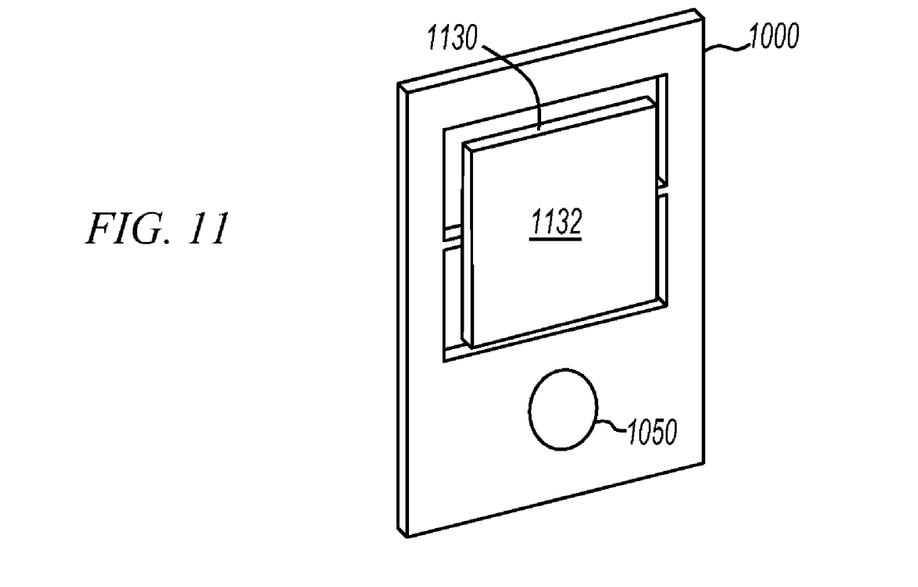
FIG. 11 shows a substrate with an integrated fold mirror and a reflective device affixed to a scanning platform.

FIG. 11 shows a substrate with an integrated fold mirror and a reflective device affixed to a scanning platform. As shown in FIG. 11, the scanning platform coupled to substrate 1000 may have a mirror 1130 affixed or bonded thereto. Mirror 1130 includes a reflective surface 1132. When at rest, reflective surface 1132 is parallel to fold mirror 1050 but in a different plane. In some embodiments, fold mirror 1050 has a thickness similar to that of mirror 1130, and they are in substantially the same plane when mirror 1130 is at rest.

Mirror 1131 is shown as a rectangle, but this is not a limitation of the present invention. For example, a different size or shape mirror may be used. Changing the size of mirror 1130 will change the inertial properties of the scanning mirror, and this may be used to advantage when designing the overall system.

Figure 12:
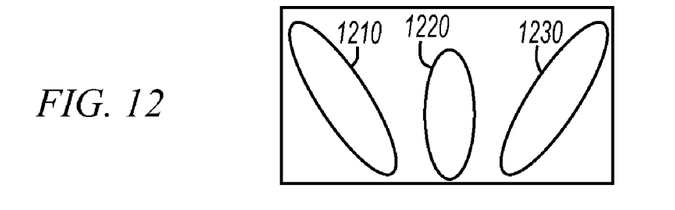
FIG. 12 shows distortion of a scanned light beam.

FIG. 12 shows distortion of a scanned light beam. Spots 1210, 1220, and 1230 show relative spot shapes of a scanned laser beam when scanned from side to side. This is shown somewhat exaggerated to illustrate that the light beam incident on the second scanning mirror (330, FIG. 3; 630, FIG. 6; 730, FIG. 7; 1130, FIG. 11) may not result in a straight line of uniform thickness across the reflective surface. The greater angle of incidence between the light beam and the reflective surface of the mirror at 1210 and 1230 cause the spot to spread.

Figure 13:
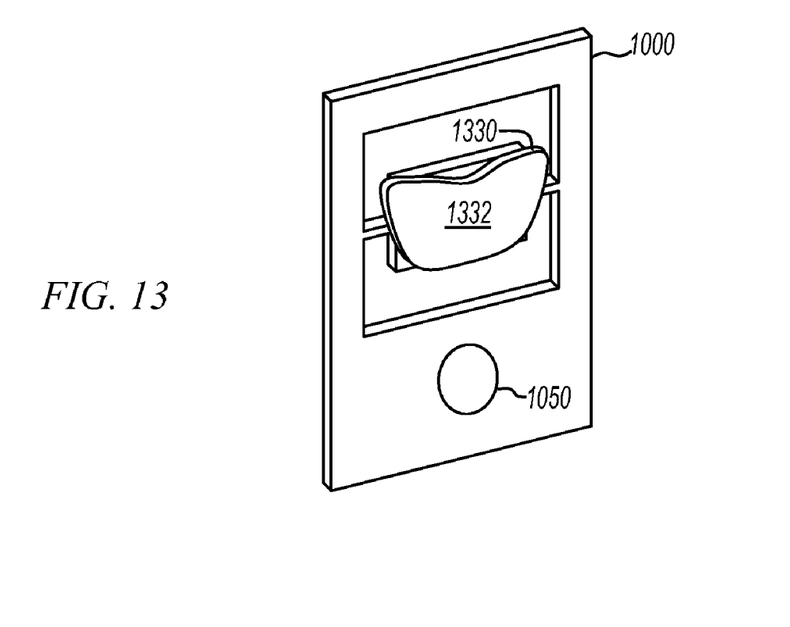
FIG. 13 shows a substrate with an integrated fold mirror and a reflective device affixed to a scanning platform.

FIG. 13 shows a substrate with an integrated fold mirror and a reflective device affixed to a scanning platform. Substrate 1000 is the same as that shown in FIGS. 10 and 11. As shown in FIG. 13, the scanning platform coupled to substrate 1000 may have a mirror 1330 affixed or bonded thereto. Mirror 1330 includes a reflective surface 1332. The shape of mirror 1330 is non-circular and non-rectangular. In different embodiments, mirror 1330 may have different shapes. The shape shown in FIG. 13 corresponds to an envelope of spot shapes in FIG. 12, but this is not a limitation of the present invention.

When at rest, reflective surface 1332 is parallel to fold mirror 1050 but in a different plane. In some embodiments, fold mirror 1050 has a thickness similar to that of mirror 1330, and they are in substantially the same plane when mirror 1050 is at rest.

Figure 14:
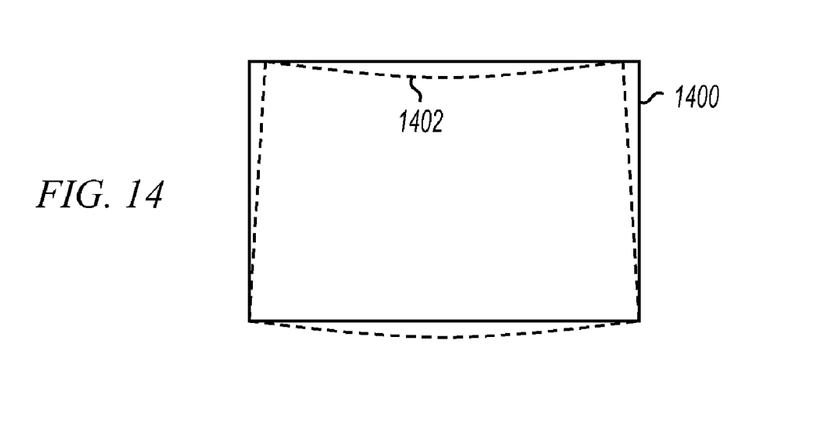
FIG. 14 shows a diagram illustrating alteration of image distortion via a wedge optic in accordance with various embodiments of the present invention.

FIG. 14 shows a diagram illustrating alteration of image distortion via a wedge optic in accordance with various embodiments of the present invention. As shown in FIG. 14, image 1400 may be displayed by a two-mirror scanning system. Image 1400 may have image distortion resulting from feeding light beams off axis to the various fold mirrors and scanning mirrors, the distortion being a result of a trajectory of the scanned beam caused by the off axis input beam and a transform from a scanning mirror to an image plane. Such image distortion due to off axis beam feeding may result in a non-square layout 1402 of image 1400, also referred to as keystone or smile distortion. Such image distortion may be analogized to the change in a rectilinear image projected onto a spherical surface when image 1400 is actually projected onto a flat surface. Smile distortion may also be referred to as remapping distortion resulting of the remapping of the image data from polar coordinates into rectilinear or Cartesian coordinates. In one or more embodiments, output optics 310 (FIGS. 3-5) and 710 (FIGS. 7-10) are capable of correcting such image distortion to result in a generally square, rectilinear layout of image 1400 via the generally wedge shaped arrangement of surfaces 312, 712 with respect to surfaces 314, 714 of output optics 310 and 710 as discussed above. In one or more embodiments, an example of such smile distortion as shown in FIG. 14 may represent about 13% distortion of image 1400 when an output optic is not used. By using an output optic in the various two-mirror scanning system embodiments, the distortion may be reduced to about 5% or lower, although the embodiments of the invention are not limited in this respect.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
    a substrate;
    a first scan mirror coupled to, and nominally parallel to, the substrate and operable to have a variable angular displacement in a first dimension;
    a fold mirror positioned on, and parallel to, the substrate; and
    a second scan mirror positioned to receive light reflected from the fold mirror and to reflect light to the first scan mirror, the second scan mirror operable to have an angular displacement in a second dimension substantially 90 degrees from the first dimension.

2. The apparatus of claim 1 wherein the substrate comprises a silicon substrate and the fold mirror comprises a reflective surface on the silicon substrate.

3. The apparatus of claim 1 wherein the first scan mirror comprises a micro-electromechanical machine (MEMS) scanning platform.

4. The apparatus of claim 1 further comprising a second fold mirror to reflect an input light beam to the fold mirror positioned on the substrate.

5. The apparatus of claim 1 further comprising an output optic.

6. The apparatus of claim 5 wherein the second fold mirror is affixed to the output optic.

7. The apparatus of claim 1 wherein the first scan mirror has a noncircular shape.

8. The apparatus of claim 7 wherein the first scan mirror has a nonrectangular shape.

9. An apparatus comprising:
a first fold mirror to reflect an input light beam;
a second fold mirror to reflect light received from the first fold mirror;
a fast scan mirror positioned to receive light from the second fold mirror and provide a light beam scanned in a first dimension; and
a slow scan mirror positioned to receive the light beam from the fast scan mirror and to provide a light beam scanned in a second dimension, wherein the slow scan mirror and the second fold mirror are coupled to a common substrate.

10. The apparatus of claim 9 wherein the slow scan mirror comprises a micro-electromechanical system (MEMS) device formed out of the common substrate.

11. The apparatus of claim 10 wherein the second fold mirror comprises a reflective portion of the common substrate.

12. The apparatus of claim 9 wherein the slow scan mirror further comprises a reflective element bonded to the MEMS device.

13. The apparatus of claim 9 wherein the input light beam is substantially parallel to the fast scan mirror when at rest.

14. The apparatus of claim 9 further comprising an output optic.

15. The apparatus of claim 14 wherein the first fold mirror is affixed to the output optic.

16. The apparatus of claim 9 wherein the slow scan mirror has a noncircular shape.

17. The apparatus of claim 16 wherein the slow scan mirror has a nonrectangular shape.

18. An apparatus comprising:
a fold mirror to reflect an input light beam;
a first scan mirror positioned to receive light from the fold mirror and provide a light beam scanned in a first dimension;
a second scan mirror positioned to receive the light beam from the first scan mirror and to provide a light beam scanned in a second dimension; and
an output optic positioned to intersect the light beam from the second scan mirror, wherein the fold mirror is positioned on the output optic.

19. The apparatus of claim 18 wherein the output optic comprises a wedge.

20. The apparatus of claim 18 wherein the first scan mirror is operable to scan faster than the second scan mirror.

21. A mobile projection device comprising:
a laser light source to produce modulated laser light;
a first fold mirror to reflect the modulated laser light;
a second fold mirror to reflect light received from the first fold mirror;
a first scan mirror positioned to receive light from the second fold mirror; and
a second scan mirror positioned to receive the light beam from the first scan mirror, wherein the second scan mirror and the second fold mirror are coupled to a common substrate.

22. The mobile projection device of claim 21 wherein the second scan mirror comprises a MEMS device formed out of the common substrate.

23. The mobile projection device of claim 22 wherein the second fold mirror comprises a reflective portion of the common substrate.

* * * * *